United States Patent
Lin et al.

(10) Patent No.: US 7,181,515 B2
(45) Date of Patent: Feb. 20, 2007

(54) METHOD OF ACCESSING DISTRIBUTED FIELD EQUIPMENTS BY A HOST THROUGH A PLURALITY OF INTELLIGENT NETWORK GATEWAYS

(75) Inventors: Chang-Min Lin, Taoyuan (TW); Jia-Cheng Ke, Hsinchu (TW); Chang-Hsieh Wu, Taichung (TW); Che-Lung Wang, Banchiau (TW)

(73) Assignee: Industrial Technology Research Institute, Hsinchu (TW)

( * ) Notice: Subject to any disclaimer, the term of this patent is extended or adjusted under 35 U.S.C. 154(b) by 769 days.

(21) Appl. No.: 10/350,784

(22) Filed: Jan. 24, 2003

(65) Prior Publication Data
US 2004/0148371 A1 Jul. 29, 2004

(51) Int. Cl.
*G06F 15/173* (2006.01)
*G06F 15/16* (2006.01)

(52) U.S. Cl. ............. 709/223; 709/201; 709/208; 709/250

(58) Field of Classification Search ............. None
See application file for complete search history.

(56) References Cited

U.S. PATENT DOCUMENTS
2002/0178295 A1 * 11/2002 Buczek et al. ............. 709/250

FOREIGN PATENT DOCUMENTS
WO  WO 9853581 * 11/1998

* cited by examiner

*Primary Examiner*—Wen-Tai Lin
(74) *Attorney, Agent, or Firm*—W. Wayne Liauh

(57) ABSTRACT

A method of accessing data from distributed field equipments by a host through a set of intelligent network gateways is disclosed. The intelligent network gateways link the host on a local area network to the field equipments that are connected to a control network. Initially, configuration software residing in the host is employed to install the intelligent network gateways and the field equipments as a set of virtual equipment data servers, which are capable of continuously accessing, updating, and storing data from the field equipments. The virtual equipment data servers always possess the field equipments' most recent data and are able to communicate to any application program with a standard communication protocol. The method and apparatus facilitate the integration of a variety of field equipments with high-speed data links in a factory environment.

4 Claims, 5 Drawing Sheets

METHOD OF ACCESSING DISTRIBUTED FIELD EQUIPMENTS BY A HOST THROUGH A PLURALITY OF INTELLIGENT NETWORK GATEWAYS

FIELD OF THE INVENTION

The present invention discloses a method to access data from field equipments by a host through intelligent network gateways over a local area network.

BACKGROUND OF THE INVENTION

A conventional supervisory system is shown in FIG. 1 in which a variety of Field equipments 2 are connected to a host 1 through a low speed serial port (e.g., RS-232 or RS-485). Multiple device drivers are installed in the host 1 to drive field equipments 2. The host 1 and field equipments 2 are a client-server architecture and the host 1 is always polling and reading data from Field equipments 2. However, the prior art shown in FIG. 1 suffers from the use of low speed rate and short communication distance serial port which limits the data response time and work range of the application system. The need for multiple device drivers in the host 1 also limits the expansion of the application system. Another solution that involves a conventional supervisory system is shown in FIG. 2, in which a variety of field equipments 5 are connected to the host 3 through network gateways 4, which are used as communication protocol adaptor between the serial port (e.g., RS-232 or RS-485) and the Ethernet port. The host 3 thinks network gateways 4 acting as virtual serial ports. Similarly, It suffers from the same problem as the prior art shown in FIG. 1, except that the work range of the application system is improved due to the use of Ethernet.

SUMMARY OF THE INVENTION

The primary object of the present invention is to provide a distributed field equipment data access method. A variety of field equipments are connected to the host through intelligent gateways, and configuration software in the host is used to establish intelligent network gateways and field equipments as virtual equipment data servers. The virtual equipment data servers always keep the last field equipment data and can link any application program with a standard communication protocol like Modbus/TCP. The method comprises these steps: (a) executing a configuration software for installation and debugging in the host; (b) inputting configuration parameters for the host intelligent network gateways and field equipments in the configuration software; (c) generating a text-script configuration file and downloading it to respective intelligent network gateways; (d) causing the network gateway to interpret the configuration file to access the field equipments and update and store received data continuously; (e) causing the intelligent network gateway and its connected field equipments to become a virtual equipment data server; (f) verifying the virtual equipment data server with the debug tool in configuration software. If verified, the virtual equipment data server installation is finished, if not, modifying the configuration parameters as stated in step (b); and (g) using an application program in the host access data from the virtual equipment data server with a standard communication protocol of LAN.

DETAILED DESCRIPTION OF THE PREFERRED EMBODIMENTS

Figure 1:
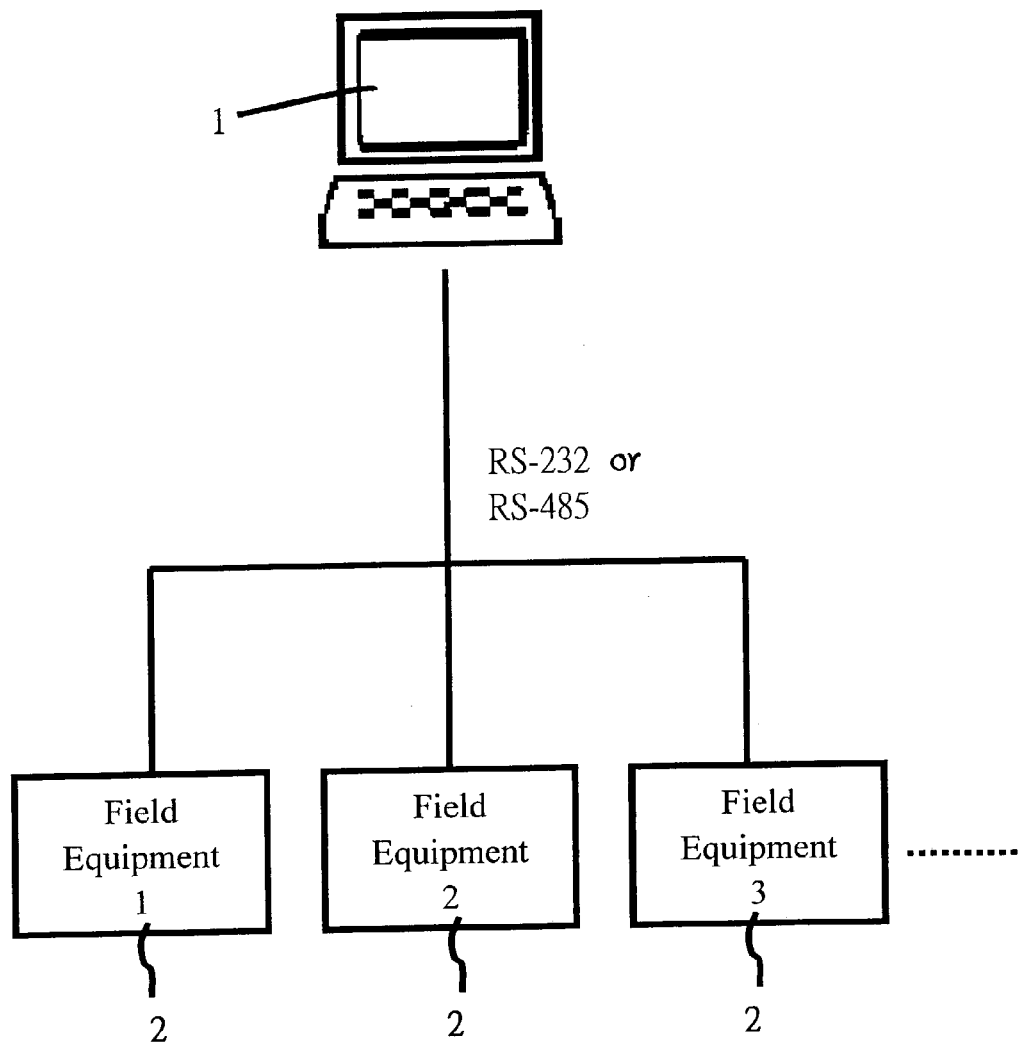
FIG. 1 presents schematically the connection of field equipments to a host in a conventional supervisory system.
Figure 2:
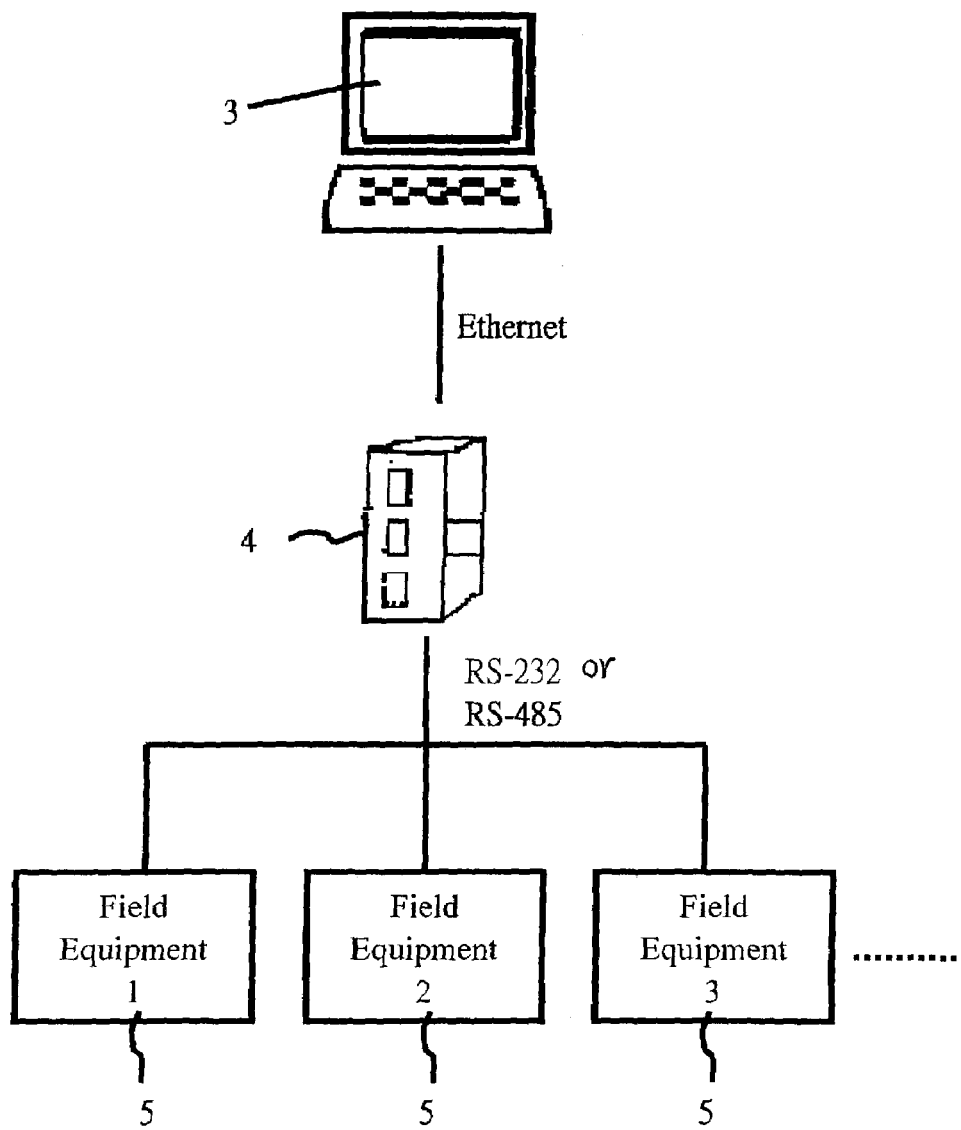
FIG. 2 presents schematically the connection of field equipments to a host through network gateways in a conventional supervisory system.
Figure 3:
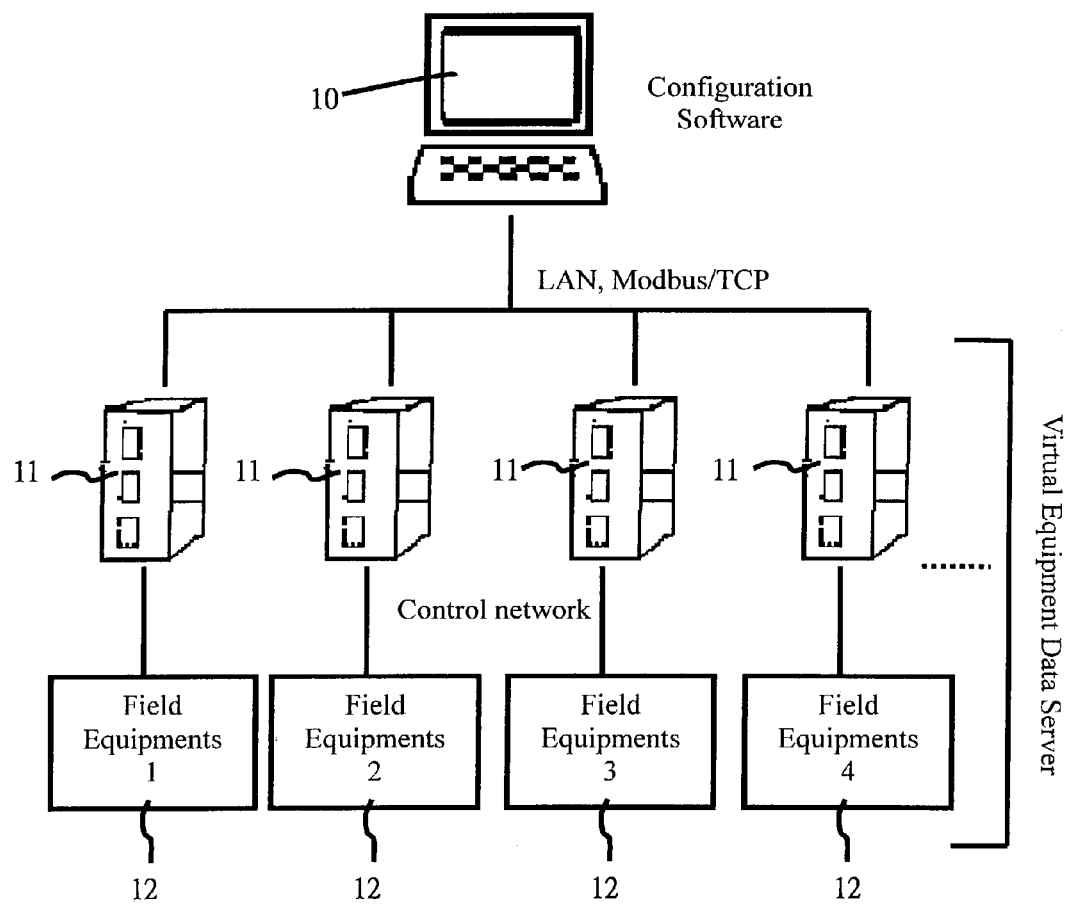
FIG. 3 presents schematically the connection of field equipments and a host through intelligent network gateways in a supervisory system with a configuration software and a virtual equipment data server, according to a preferred embodiment of the present invention.
Figure 4:
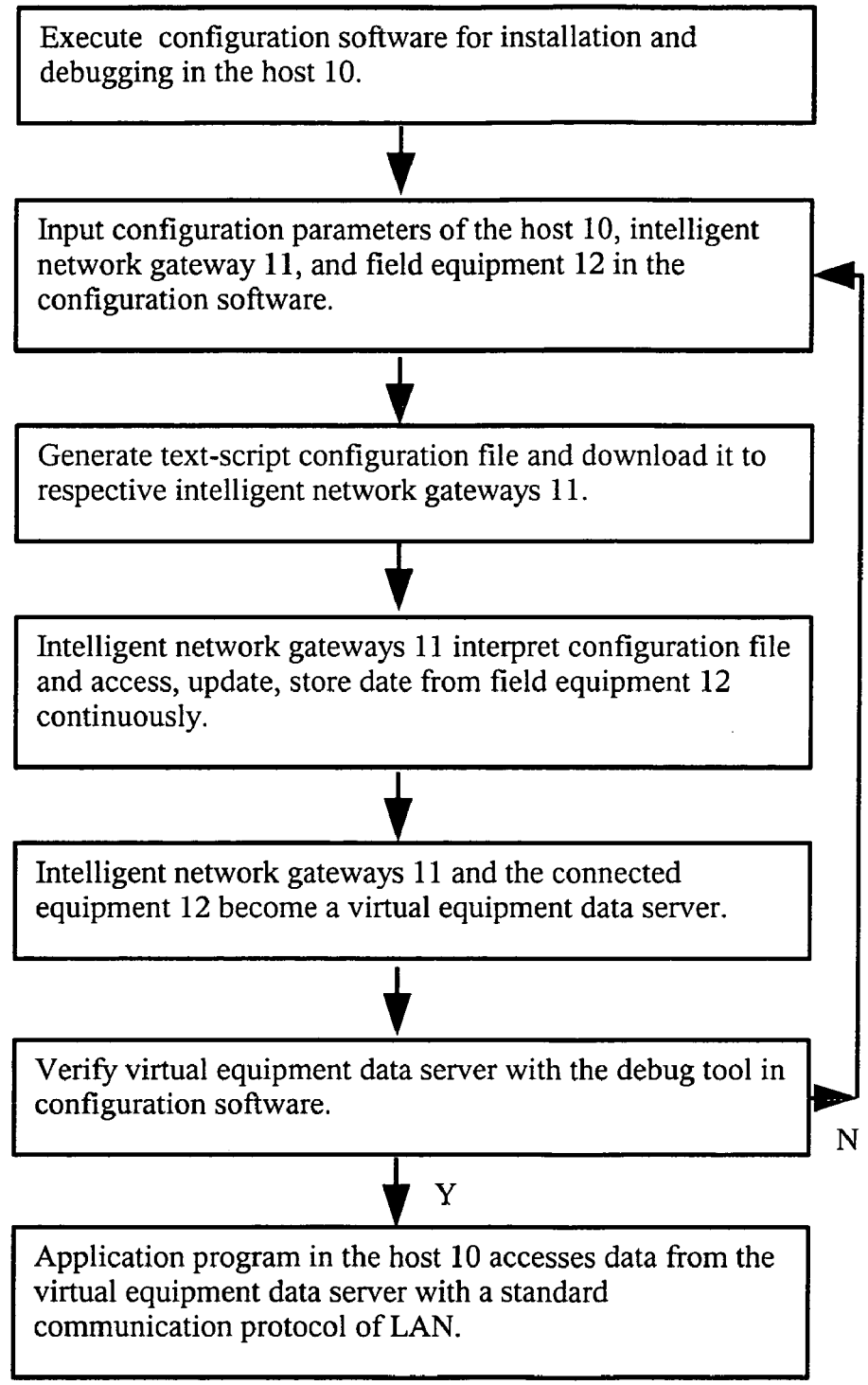
FIG. 4 is a flowchart illustrating the steps of the distributed field equipment data access method according to a preferred embodiment of the invention.

Referring to FIG. 3, Field equipments 12 with Programmable Logical Controllers (PLCs) are connected to the host 10 through intelligent network gateways 11, which link the PLCs over a control network (e.g., RS-232) and link to the host 10 over a LAN such as Ethernet. Furthermore, the host 10 can be Pentium III personal computer or above running Windows 95 or above. A configuration software with a graphic user interface is executed in the host 10. In the installation phase, it can simulate the connection of the host 10 intelligent network gateways 11 and field equipments 12 on-site with icons and lines in the active window, and user can click each icon to input respective configuration parameters. After finishing the configuration input, it will generate a text-script configuration file, which contains BASIC-like commands holding all the input parameters including equipment types communication port parameters, IDs, data read or write, access start address, access length, data buffers, access retry times, time-out . . . etc., and download the file to the respective intelligent network gateway 11 over the Ethernet. The intelligent network gateway 11 is embedded with firmware of containing network communication protocol transfer, respective field equipment device drivers, a standard communication protocol, and a configuration file interpreter. After the gateway 11 receives the configuration file download from the host 10, it has intelligence to interpret and execute the configuration file automatically and begin to access, update, and store field equipment data continuously. And now, the intelligent network gateway 11 and field equipments 12 become a virtual equipment data server, and the virtual equipment data server can be verified with a debug tool contained in the configuration software. If verified, the installation of a virtual equipment data server is finished; if not, the parameters already input are already input are examined and modified.

An exemplary text-script configuration file is generated for the scenario in which field equipment 12 OMRON_C200 PLC connects to the intelligent network gateway 11 with COM1_RS232 serial port, and data in DM0-24 of OMRON_C200 PLC are read and stored in the buffer 1 of the network gateway

| contents | comments |
|---|---|
| !--- | ; File header |
| AUTO | ; Set automatic mode |
| COM1,9600,7,E,2,100,1 | ; Set COM1 parameters |
| !==== | ; Command header |
| [HOST_LINK] | ; Procedure name |
| (COM1_RS232_OMRON_C200) | ; Block name, COM No., and PLC type |
| COMMAND=READ | ; Read PLC DM |
| ID=0 | ; PLC ID No. 0 |
| LENGTH=25 | ; Read DM length 25 |
| PLC_START=0 | ; DM read start address 0 |
| LINKLIST_START=0001 | ; Data stored in buffer 1 of network gateway |
| - | ; Block end |
| [END] | ; Procedure end |
| !!!! | ; Command end |

In this example, the intelligent network gateway 11 and OMRON_C200 PLC become a virtual equipment data server according to the configuration file mentioned above, and the data server always keeps the last DM0-24 data of OMRON_C200 PLC in the buffer 1 of the intelligent network gateway 11.

Figure 5:
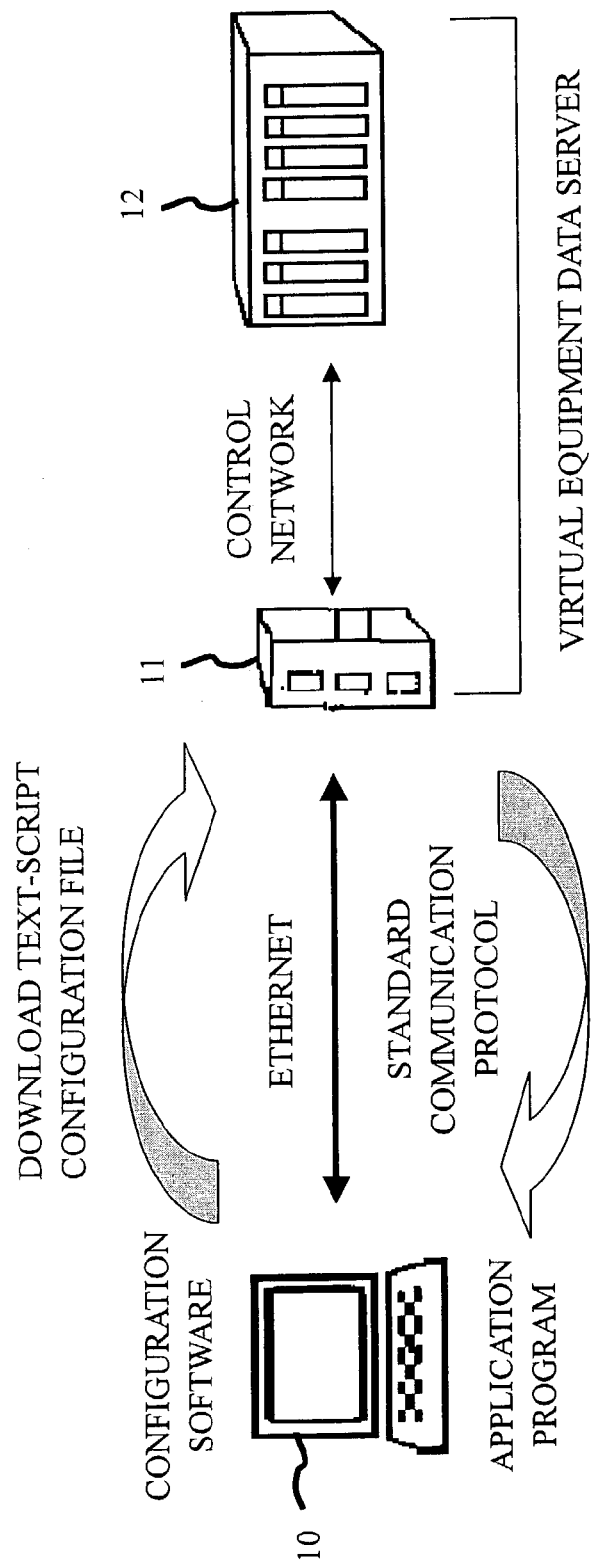
FIG. 5 presents schematically the virtual equipment data server that has been installed with a configuration software and an application program to access data from the virtual equipment data server

As stated above, the intelligent network gateway 11 is provided with a standard communication protocol such as Modbus/TCP to link the application program such as SCADA software in-Tocuh or i-Fix. In these application programs, executing Modbus/TCP communication protocol link program of I/O server and tagname dictionary to link and define the data of the intelligent network gateway 11 to the application program in the host 10. The application program now access data from the virtual equipment data server over high speed Ethernet with Modbus/TCP (refer to FIG. 5), not from field equipments 12 over low speed serial port with OMRON_C200 PLC device driver.

While the present invention has been described by means of specific embodiments, numerous modifications and variations could be made thereto by those skilled in the art without departing from the scope and spirit of the invention set forth in the claims.

What is claimed is:

1. A distributed field equipment data access method, comprising the steps of:
    (a) obtaining a distributed field equipment data access apparatus which includes a host, a plurality of intelligent network gateways respectively connected to a plurality of field equipments over a control network, a local area network for connecting the intelligent network gateways to the host, and a configuration software in the host with a graphic user interface for installing and debugging a virtual equipment data server;
    (b) using the configuration software in an installation phase to input configuration parameters the intelligent network gateways and the field equipments, respectively;
    (c) using the configuration software to generate a text-script configuration file which contains commands holding all the configuration parameters, and downloading the configuration file to each of the intelligent network gateways;
    (d) using a firmware in each of the intelligent network gateways to interpret and execute the configuration file automatically after the configuration file is received from the host;
    (e) causing each of the intelligent network gateways to access, update, and store field equipment data continuously according to a content of the configuration file whereby, the intelligent network gateways and the field equipments becoming the virtual equipment data server;
    (f) using a debug tool in the configuration software to verify the virtual equipment data server, if verified, the installation of the virtual equipment data server is complete, if not, the configuration parameters that are already input are modified and steps (b) through (f) are repeated; and
    (g) using a standard communication protocol provided in the intelligent network gateways to link the virtual equipment data server and an application program in the host,
    wherein the graphic user interface in the configuration software allows the simulation of connections between the intelligent network gateways and the field equipments with icons and lines in an active window, and a user can click each icon to input relative configuration parameters.

2. The method of claim 1, wherein the configuration parameters include equipment types, communication port parameters, IDs, data read or write, access start address, access length, data buffers, access retry times, and time-out.

3. The method of claim 1, wherein the intelligent network gateways and the field equipments form a virtual equipment data server according to the configuration file downloaded from the host, to access, update, and store field equipment data continuously.

4. The method of claim 1, wherein the intelligent network gateway is provided with a standard communication protocol, and the virtual equipment data server is linked to application programs which possess the standard communication protocol.

* * * * *